(12) United States Patent
Kalisz et al.

(10) Patent No.: US 8,210,297 B2
(45) Date of Patent: Jul. 3, 2012

(54) LAYOUT OF COMPACT ALL TERRAIN VEHICLE FOR EXHAUST OUTLET DUCT AND AIR INLET DUCT POSITIONING

(75) Inventors: Scott Kalisz, Newnan, GA (US); Andrew Metzger, Newnan, GA (US); Bryan Harper, Newnan, GA (US)

(73) Assignees: Yamaha Motor Manufacturing Corporation of America, Newnan, GA (US); Yamaha Hatsudoki Kabushiki Kaisha, Shizuoka (JP)

( * ) Notice: Subject to any disclaimer, the term of this patent is extended or adjusted under 35 U.S.C. 154(b) by 344 days.

(21) Appl. No.: 12/616,283

(22) Filed: Nov. 11, 2009

(65) Prior Publication Data
US 2011/0108341 A1    May 12, 2011

(51) Int. Cl.
*B60K 13/02* (2006.01)

(52) U.S. Cl. ..................................... 180/68.2; 180/68.3
(58) Field of Classification Search .................. 180/68.1, 180/68.2, 68.3
See application file for complete search history.

(56) References Cited

U.S. PATENT DOCUMENTS

| | | | | |
|---|---|---|---|---|
| 4,744,432 A | * | 5/1988 | Shibata et al. | 180/68.1 |
| 6,786,290 B2 | * | 9/2004 | Kuji et al. | 180/68.1 |
| 7,347,296 B2 | * | 3/2008 | Nakamura et al. | 180/68.1 |
| 8,002,061 B2 | * | 8/2011 | Yamamura et al. | 180/68.1 |

* cited by examiner

*Primary Examiner* — John Walters
(74) *Attorney, Agent, or Firm* — Keating & Bennett, LLP (57) ABSTRACT

The exhaust port 35*b* of the transmission air exhaust duct 35 is provided to one side of the steering shaft 28 with respect to the widthwise direction of the vehicle, an air intake port 9*a* is provided to the other side of the steering shaft 28 with respect to the widthwise direction of the vehicle.

22 Claims, 12 Drawing Sheets

LAYOUT OF COMPACT ALL TERRAIN VEHICLE FOR EXHAUST OUTLET DUCT AND AIR INLET DUCT POSITIONING

1. TECHNICAL FIELD

The present invention relates to a compact all terrain vehicle, and more specifically, to an improvement of the layout of the transmission case exhaust duct and air cleaner.

2. BACKGROUND ART

A compact all terrain vehicle is disclosed for instance in Japanese Unexamined Patent Application Publication 2006-027425. In this compact vehicle, an engine unit equipped with a V-belt type automatic transmission is mounted below the seat. The intake port of the intake duct of the V-belt type automatic transmission is arranged near the steering shaft to prevent ingress of water through the intake duct. Furthermore, the air cleaner is installed above the engine behind the steering shaft to prevent ingress of water through the air cleaner. The exhaust duct extends rearwardly from the V-belt type automatic transmission and includes an exhaust port which is arranged near the muffler. In this position, it is difficult to prevent ingress of water through the exhaust duct as the exhaust port is positioned low.

In addition there is a demand in the market for vehicles which have a more compact body. However, with limited space, it is difficult to position the exhaust duct such that the exhaust port may be positioned in a manner which impedes the ingress of water while not interfering with the operations of the vehicle.

SUMMARY OF THE INVENTION

The present invention provides an all terrain vehicle which allows decline in engine performance to be avoided while having a compact body.

The present invention is an all terrain vehicle that includes: a vehicle body frame; a pair of left and right front wheels supported on the front part of the vehicle body frame and a pair of left and right rear wheels supported on the rear part of the vehicle body frame; a seat supported on the vehicle body frame so as to be located between the front wheels and the rear wheels with respect to the front-back direction of the vehicle; a steering shaft which steers the front wheels and is supported on the middle part of the vehicle body frame with respect to the widthwise direction of the vehicle, with a handlebar member provided at its top part; an engine unit arranged on the vehicle body frame to the rear of the steering shaft with respect to the front-back direction of the vehicle, including a crankcase, a cylinder extending from the crankcase, and a transmission case which is provided to the side of the crankcase in the widthwise direction of the vehicle and houses a V-belt type automatic transmission; footrests supported on the vehicle body frame so as to be located on both sides of the engine unit with respect to the widthwise direction of the vehicle; an exhaust duct which has an exhaust port provided to one side of the steering shaft with respect to the widthwise direction of the vehicle and exhausts air from inside the transmission case; an air cleaner which is arranged above the cylinder and which has an intake port provided to the other side of the steering shaft with respect to the widthwise direction of the vehicle, and cleans the air to be taken into the cylinder; and a cover member which covers the area around the steering shaft, the exhaust port and the intake port and has an opening which opens to the front of the vehicle.

In one embodiment, the exhaust port of the exhaust duct is provided to one side and the intake port of the air cleaner is provided to the other side, with respect to the widthwise direction of the vehicle, of the steering shaft provided in the middle with respect to the widthwise direction of the vehicle, a cover member covers the area around the steering shaft, the intake port and the exhaust port, and an opening which opens to the front of the vehicle is provided in the cover member.

Thus, an air flow from the front to the rear is generated inside the cover member when the vehicle travels, and when that air flow passes along one side of the steering shaft, the exhaust discharged from the exhaust port is pushed toward the rear of the vehicle. The exhaust can thereby be kept from being sucked into the intake port of the air cleaner even if the exhaust port and intake port are arranged relatively close to each other. As a result, decline in engine performance can be avoided while making the body compact.

DETAILED DESCRIPTION

Embodiments of the present invention will be described below with reference to the drawings. FIGS. 1 through 12 are drawings illustrating a vehicle according to an embodiment of the present invention. In the present specification, unless indicated otherwise, front, back, left and right signify the front, back, left and right as viewed while sitting on the seat.

In one embodiment, vehicle 1 includes a vehicle body frame 2, a pair of left and right front wheels 3a, 3b arranged at the front of the vehicle body frame 2 and a pair of left and right rear wheels 4a, 4b arranged at the rear; and a saddle seat 6 supported on the vehicle body frame 2 so as to be located between the front wheels 3a, 3b and the rear wheels 4a, 4b with respect to the front-back direction of the vehicle.

The left and right front wheels 3a, 3b are supported so as to be vertically slidable on the vehicle body frame 2 by means of left and right front suspensions 38. The left and right rear wheels 4a, 4b are supported so as to be vertically slidable on the vehicle body frame 2 by means of rear suspensions 39. In one embodiment, low pressure wide balloon tires are installed on the front wheels 3a, 3b and rear wheels 4a, 4b.

Figure 5:
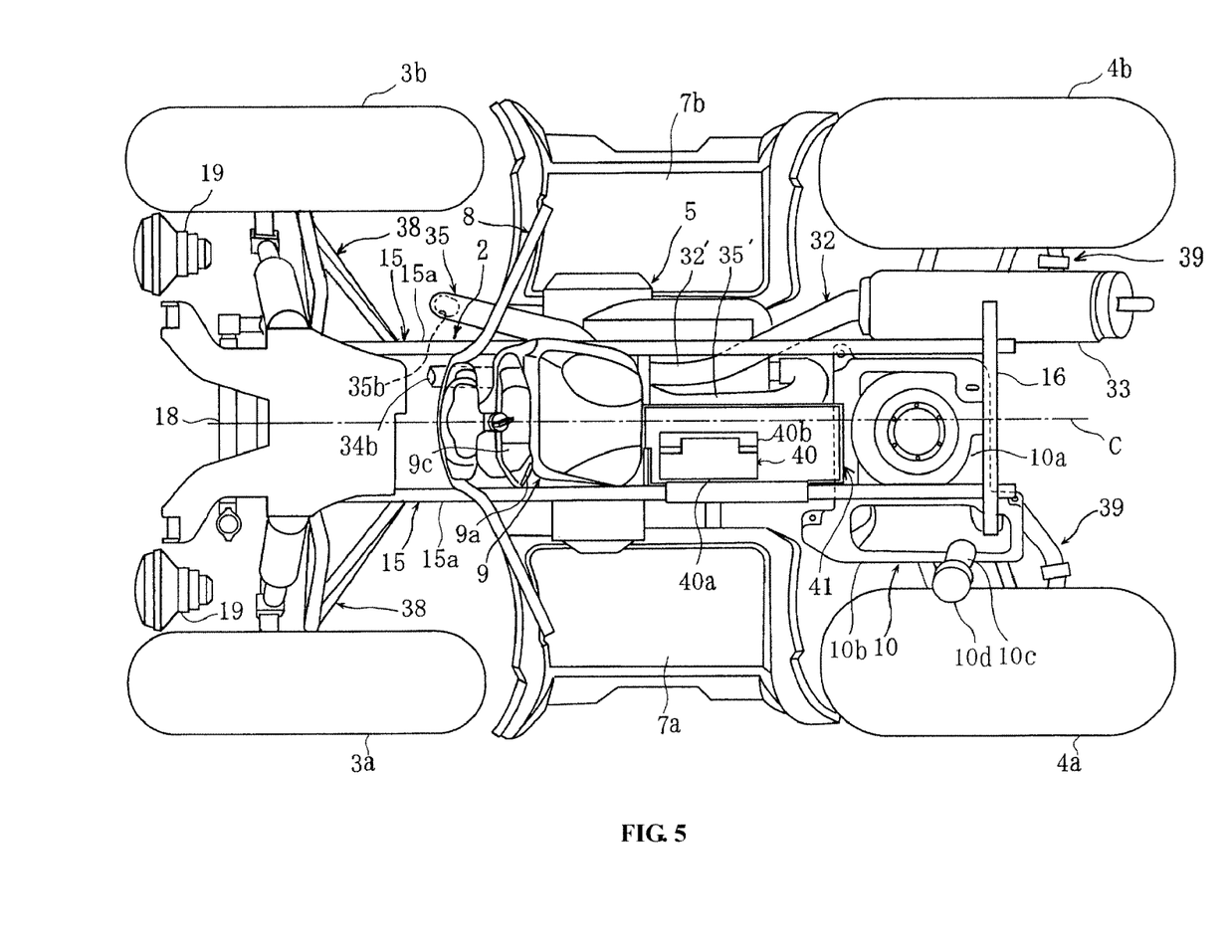
FIG. 5 is a plan view of the state where the vehicle body cover, fender, seat, etc. of said vehicle have been removed.
Figure 6:
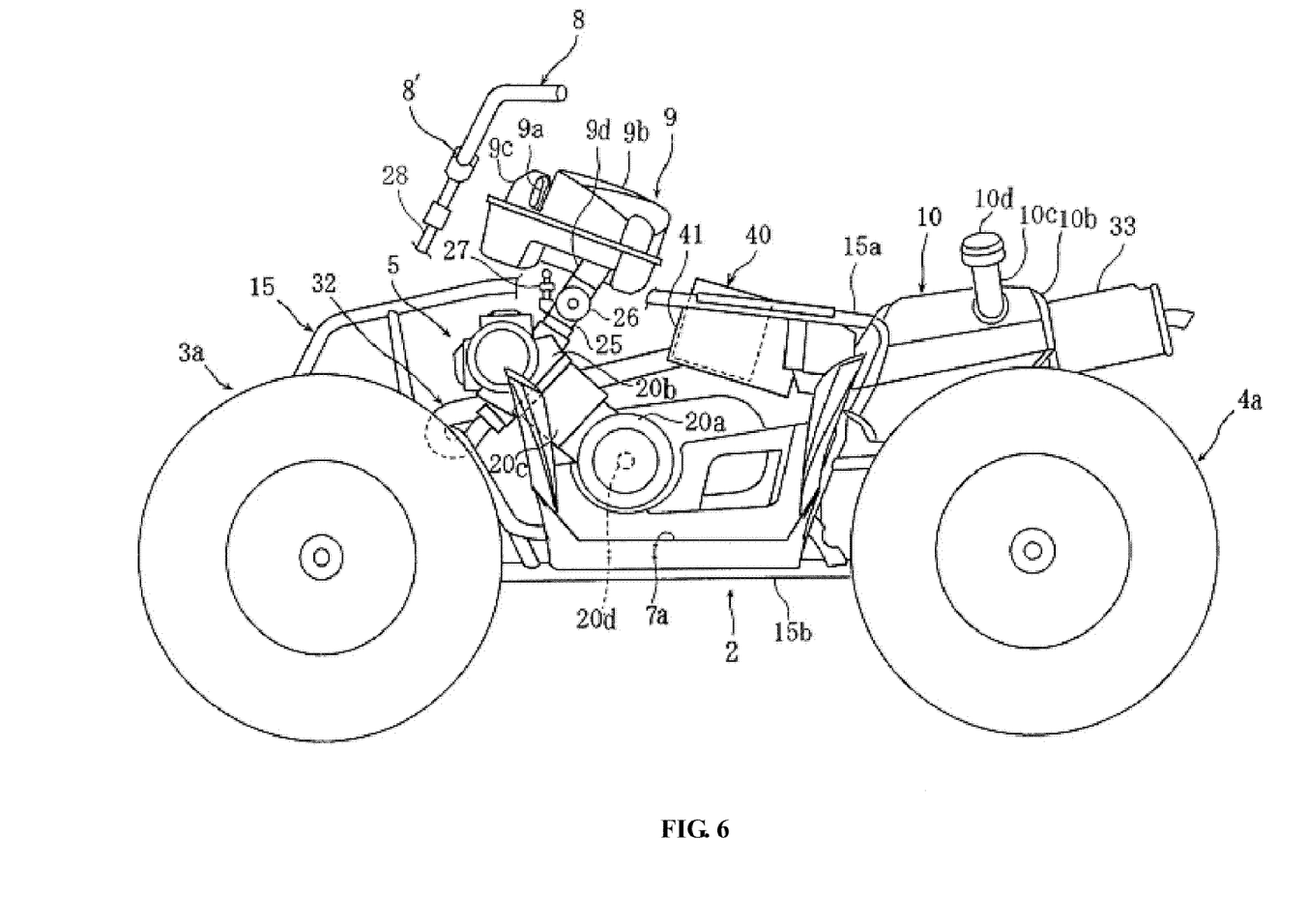
FIG. 6 is a left side view of the engine unit mounted on the vehicle body frame of said vehicle.
Figure 7:
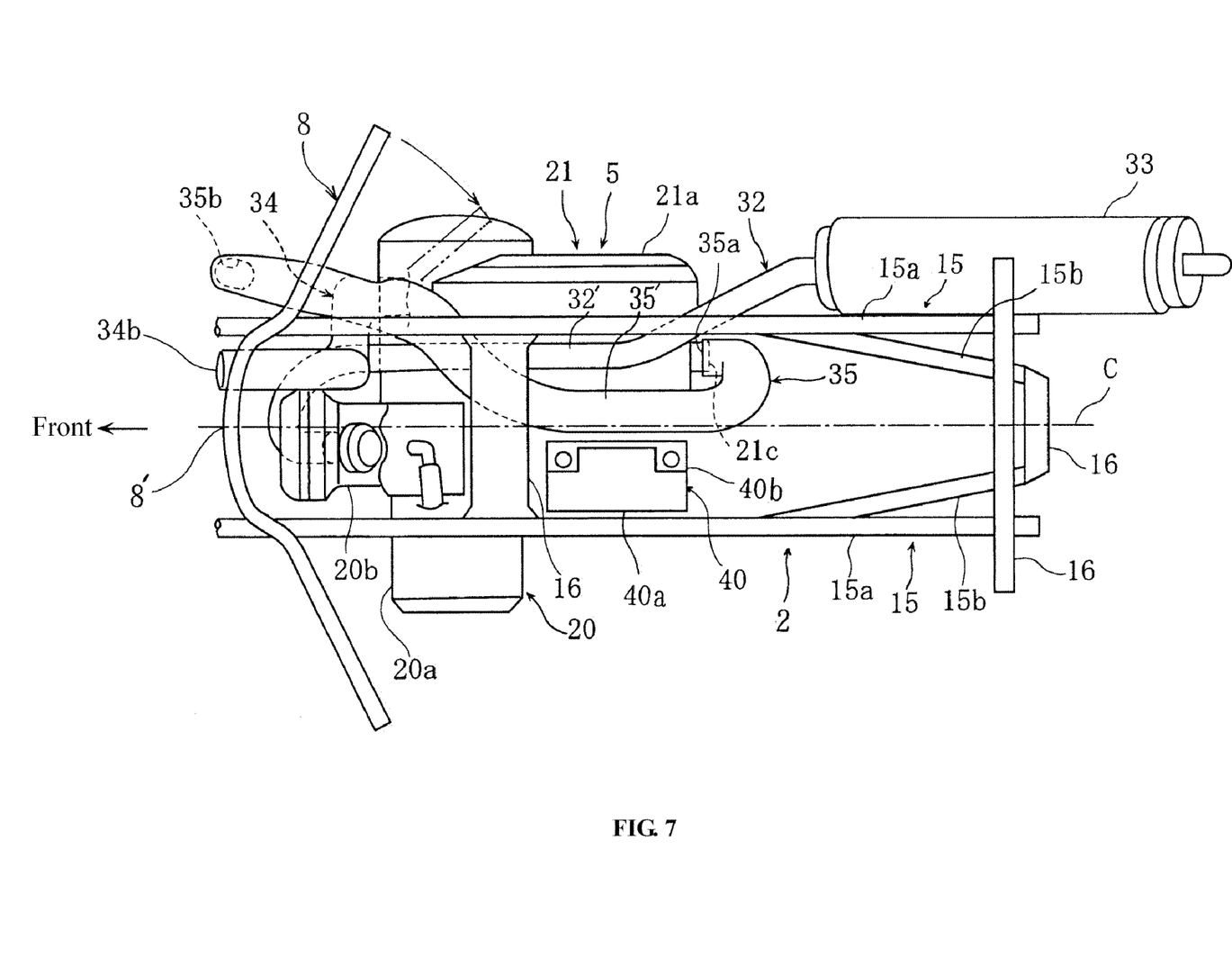
FIG. 7 is a plan view of said engine unit.
Figure 8:
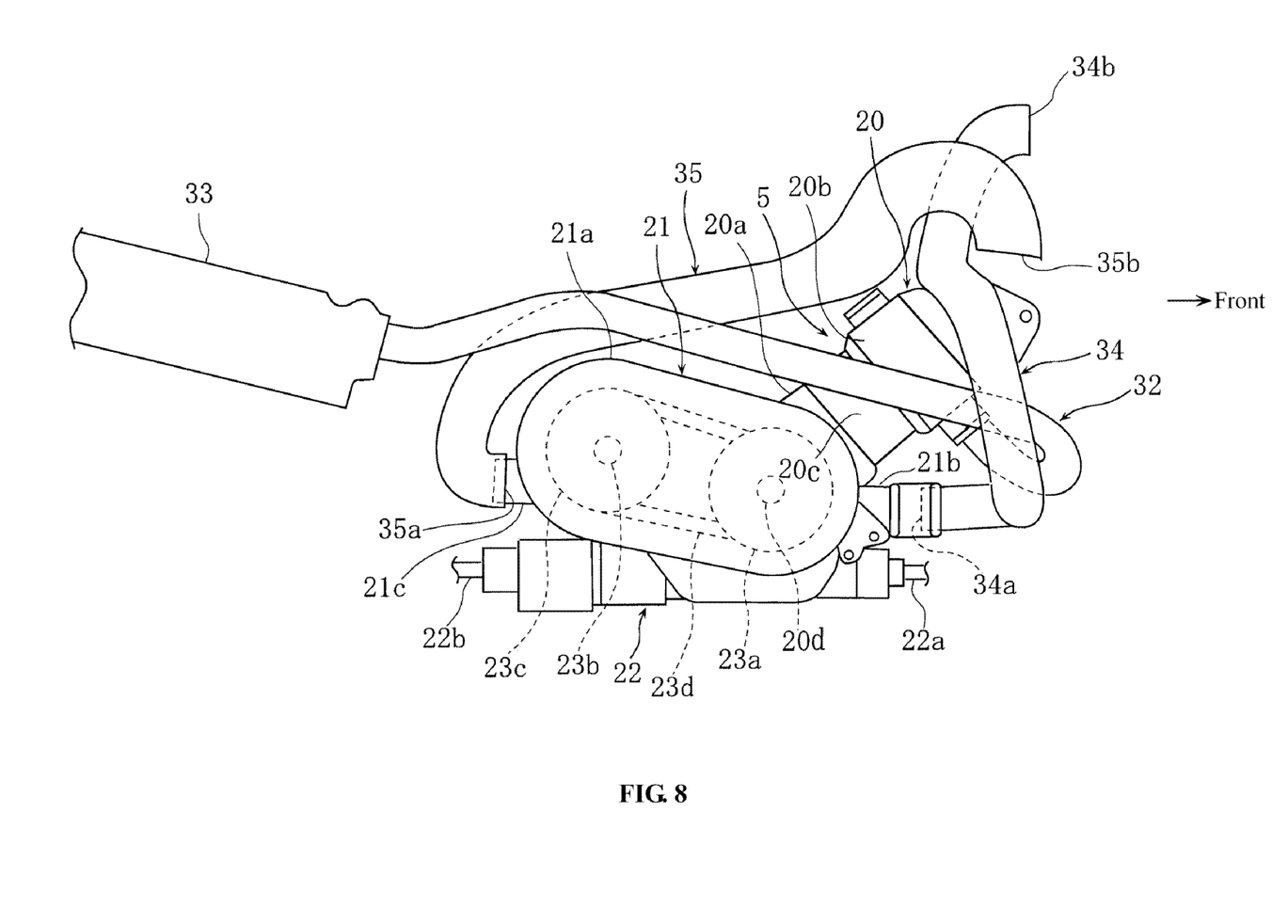
FIG. 8 is a right side view of said engine unit.
Figure 9:
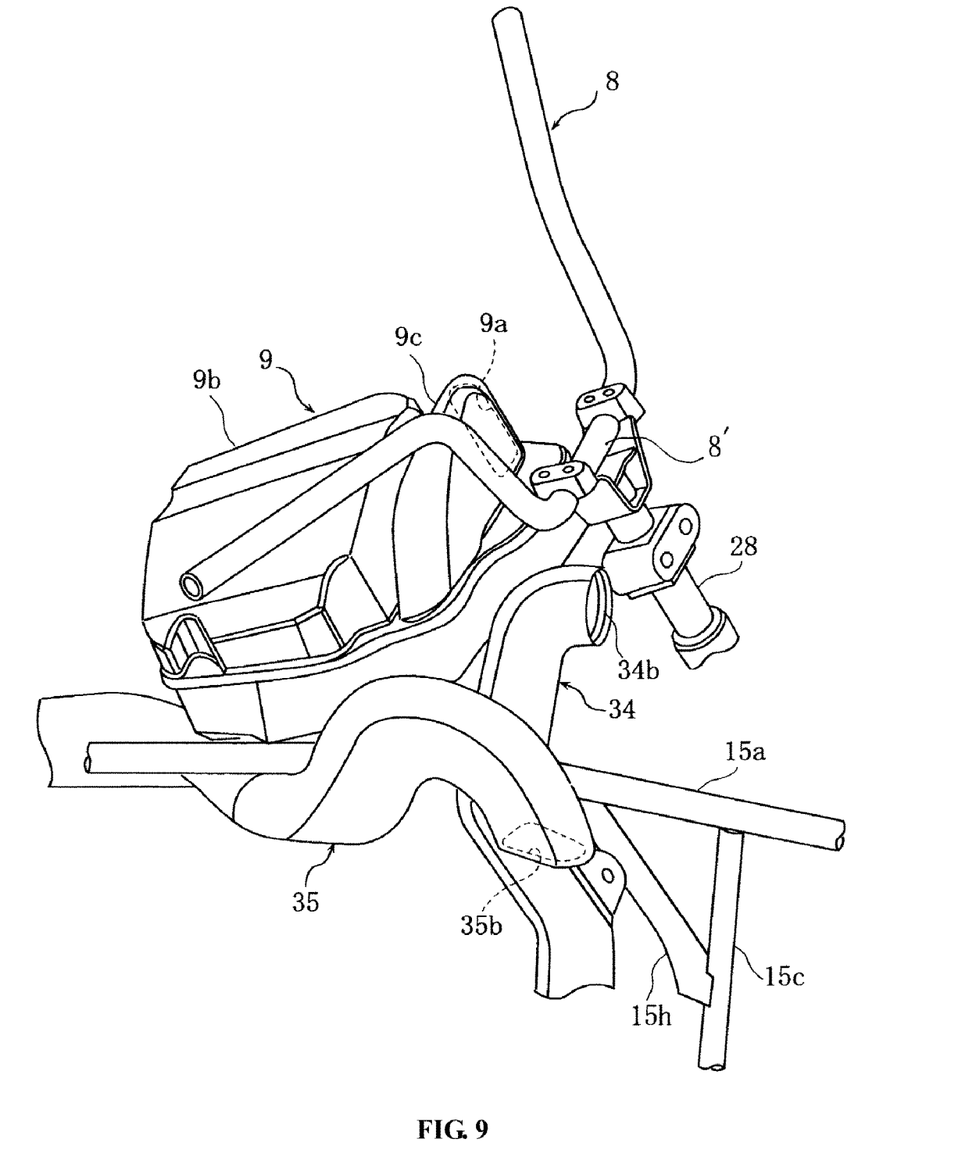
FIG. 9 is a perspective view diagonally from the front right of the air cleaner installed on said vehicle frame.
Figure 10:
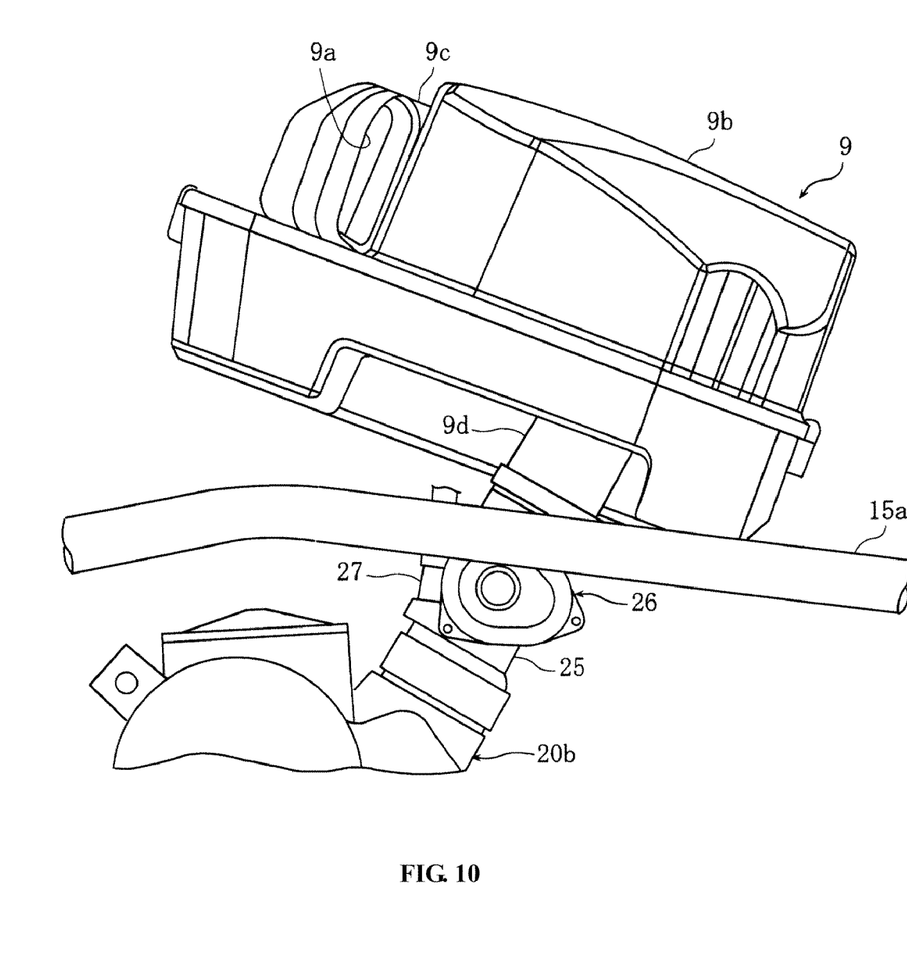
FIG. 10 is a left side view of said air cleaner.
Figure 11:
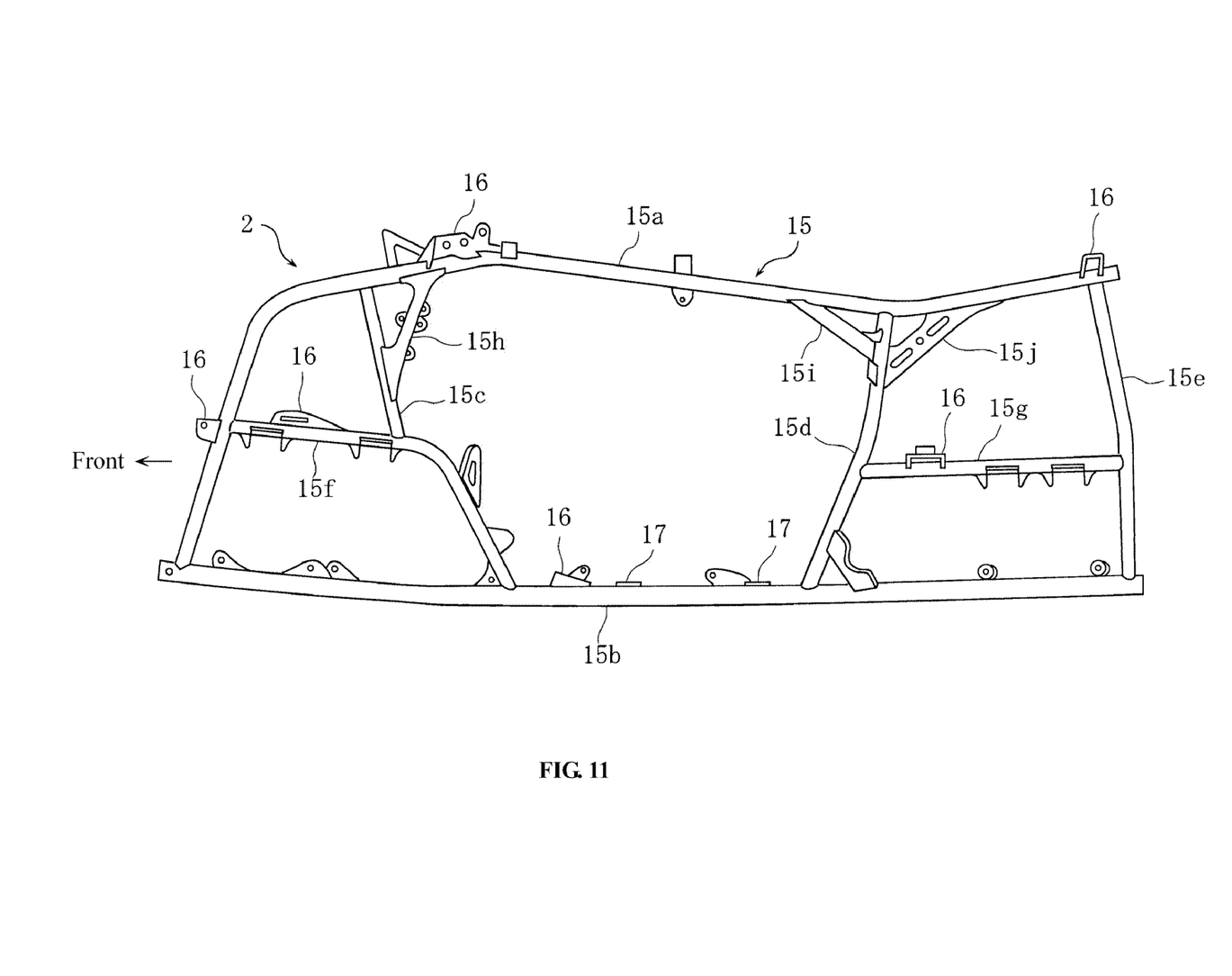
FIG. 11 is a left side view of said vehicle body frame.
Figure 12:
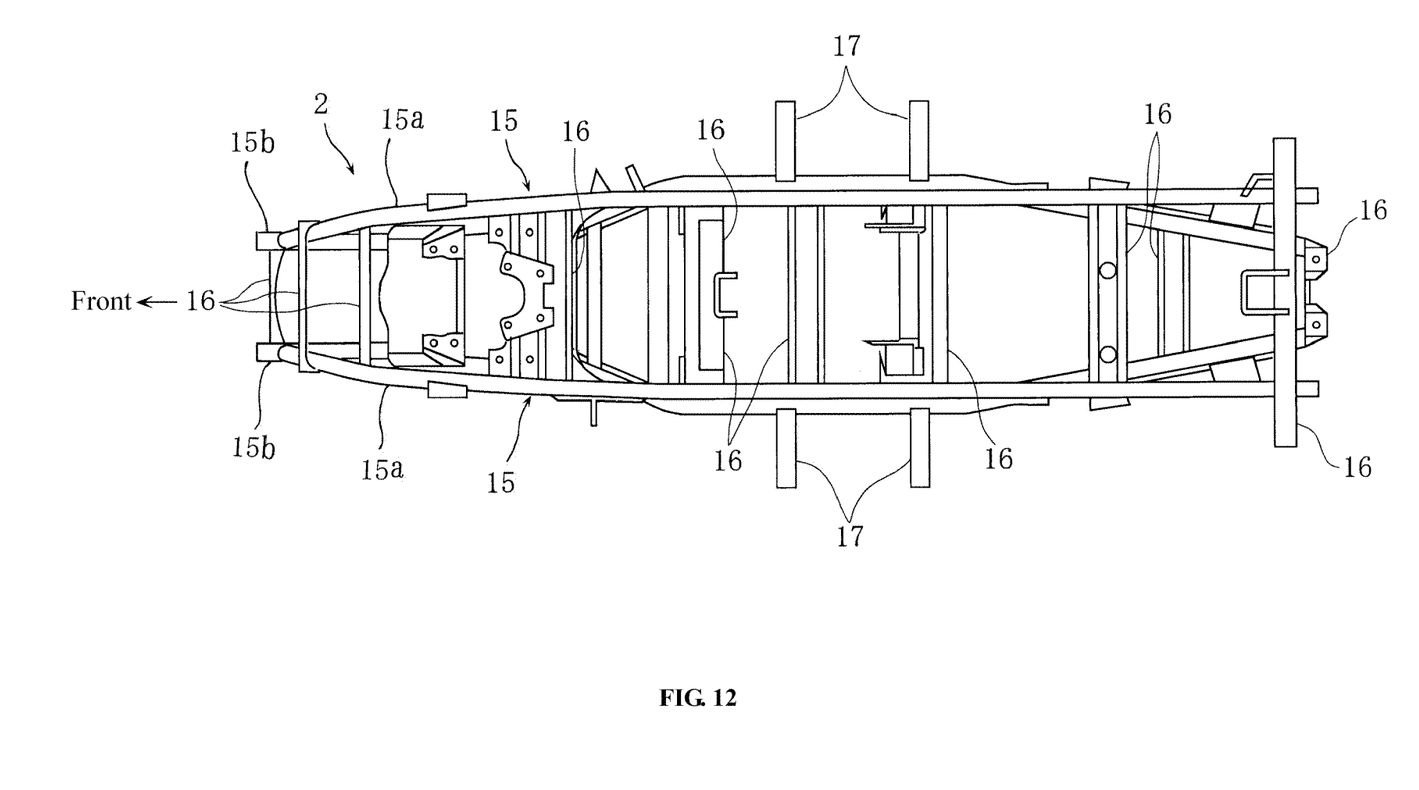
FIG. 12 is a plan view of said vehicle body frame.

Left and right front fenders 12 which cover the top of left and right front wheels 3a, 3b and left and right rear fenders 13 which cover the top of the left and right rear wheels 4a, 4b are attached to the vehicle body frame 2. Note that in FIG. 5, illustration of the left and right front fenders and left and right rear fenders has been omitted.

Furthermore, the vehicle 1 includes a steering shaft 28 which is supported in the middle of the vehicle body frame 2 with respect to the widthwise direction of the vehicle and steers the left and right front wheels 3a, 3b. A handlebar member 8 is attached to the top end part of the steering shaft 28. Furthermore, an engine unit 5 is mounted on the vehicle body frame 2 to the rear of the steering shaft 28 with respect to the front-back direction of the vehicle, an air cleaner 9 is arranged above the engine unit 5, and left and right footrests 7a, 7b are arranged on the left and right sides with respect to the widthwise direction of the vehicle.

The vehicle 1 also includes a cover member 14 which covers the area around the steering shaft 28 and the air cleaner 9, as well as covering the area below and around the seat 6. A service opening 14a, which is opened and closed by the seat 6, is formed in the vehicle body cover 14 below the seat 6.

The vehicle body frame 2 includes a pair of left and right steel tube frame members 15 extending in the front-back direction of the vehicle and multiple cross members 16 which extend in the widthwise direction of the vehicle and join the left and right frame members 15 to each other.

The left and right frame members 15 are substantially symmetrical between left and right. Each frame member 15 includes an upper frame 15a which extends in the front-back direction of the vehicle below the seat 6, and an underframe 15b which extends in the front-back direction of the vehicle below the engine unit 5. The front part of the upper frame 15a and underframe 15b is connected by a front suspension pipe 15f and front pipe 15c, and the rear part is connected by an intermediate pipe 15d and rear pipe 15e. The intermediate pipe 15d and rear pipe 15e are further connected by a rear suspension pipe 15g, 15h, 15i and 15j are reinforcing members.

Footrest brackets 17 which support the footrests 7a, 7b are connected to the middle part, with respect to the front-back direction, of the left and right underframes 15b so as to project outward in the widthwise direction of the vehicle.

A battery 40 is arranged below the seat 6 on the vehicle body frame 2, and a fuel tank 10 is arranged behind the battery 40 and between the left and right rear wheels 4a, 4b. Furthermore, a radiator 18 is arranged at the front end part of the vehicle body frame 2, and a pair of left and right headlights 19 are arranged to the front of the radiator 18.

The battery 40 is housed together with electrical components such as relay switches and fuses and a tool kit (not illustrated) in a storage box 41 supported on the vehicle body frame 2. The battery 40 has a rectangular parallelepiped shape with a long side 40a and short side 40b, and is arranged in plan view with the long side 40a oriented in the front-back direction of the vehicle and the short side 40b oriented in the widthwise direction of the vehicle.

The battery 40 is arranged so as to be located between the left and right frame members 15 and below the seat 6, and to the front of the fuel tank 10. The battery 40 is arranged so as to overlap the engine unit 5 in plan view and is offset to the left in the widthwise direction of the vehicle in relation to the centerline C passing through the middle of the vehicle with respect to the widthwise direction, i.e. in the direction opposite to the parts 32', 35' of the exhaust pipe 32 and exhaust duct 35 between the frame members 15, as discussed below (see FIG. 7).

The fuel tank 10 includes a tank main body 10a formed so as to be located between the left and right frame members 15 in plan view of the vehicle and that houses a fuel pump (not illustrated), an extension part 10b formed continuing from the tank main body 10a so as to be located to the outside of the left frame member 15 with respect to the widthwise direction of the vehicle, a fuel fill port 10c formed extending upward from the extension part 10b, and a fuel cap 10d which opens and closes the fill port 10c.

In one embodiment, the engine unit 5 has a structure wherein a water cooled four cycle single cylinder type engine 20 and a V-belt type automatic transmission 21 are integrally connected, and is mounted on the vehicle body frame 2 with the crankshaft 20d being oriented in the widthwise direction of the vehicle and horizontally.

The engine 20 includes a crankcase 20a which houses the crankshaft 20d, and a cylinder body 20c and cylinder head 20b connected to the top front part of the crankcase 20a so as to extend diagonally, forward and upward.

The automatic transmission 21 is housed in a transmission case 21a connected to the right side wall of the crankcase 20a with regard to the widthwise direction of the vehicle. The automatic transmission 21 has a structure wherein a drive pulley 23a mounted on the crankshaft 20d and a follower pulley 23c connected to a follower shaft 23b are coupled by a V-belt 23d.

A front wheel drive shaft 22a extending toward the front of the vehicle and a rear wheel drive shaft 22b extending toward the rear of the vehicle are coupled to the follower shaft 23b of the automatic transmission 21 via a power transmission mechanism 22.

The front wheel drive shaft 22a is coupled to the left and right front wheels 3a, 3b by means of a front gear unit 30 and rotationally drives the front wheels 3a, 3b. Furthermore, the rear wheel drive shaft 22b is coupled to the left and right rear wheels 4a, 4b by a rear gear unit 31 comprising a wet brake 45 and rotationally drives the rear wheels 4a, 4b (see FIG. 4).

An air intake tube 25 is connected to the rear wall of the cylinder head 20b of the engine 20. The air intake tube 25 is arranged between the left and right frame members 15 and extends substantially vertically upward from the cylinder head 20b. A throttle body 26 is installed midway in the air intake tube 25, and the air cleaner 9 is connected to the upstream end of the air intake tube 25 (see FIG. 6).

A fuel injection valve 27 is installed in the throttle body 26. This fuel injection valve 27 injects and supplies high pressure fuel from a high pressure fuel pump arranged inside the fuel tank 10 into the combustion chamber of the cylinder head 20b.

An exhaust pipe 32 is connected to the front wall of the cylinder head 20b of the engine 20. This exhaust pipe 32 is brought out diagonally forward and downward from the cylinder head 20b, then has a part 32' which passes along the right side of the cylinder head 20b and between the left and right frame members 15 in plan view, and after that part 32', has a part which extends diagonally upward toward the rear of the vehicle, with a muffler 33 being connected to the downstream end thereof. Viewed from above, this muffler 33 is arranged between the right side upper frame 15a and the right rear wheel 4b.

The air cleaner 9 is mounted further to the rear of the vehicle than the steering shaft 28, and is attached to the left and right upper frames 15a through the cross members 16.

The air cleaner 9 includes a cleaner main body 9b containing an element (not illustrated) which cleans the air to be introduced into the combustion chamber of the engine unit 5; an intake duct 9c, formed connected to the front wall of the cleaner main body 9b, which extends in the widthwise direction of the vehicle; and a discharge duct 9d, which is formed connected to the bottom wall of the cleaner main body 9b, and to which the air intake tube 25 is connected.

An intake port 9a which sucks in outside air is formed in the intake duct 9c. This intake port 9a is arranged so as to be located to the left side (the other side) of the steering shaft 28 with respect to the widthwise direction of the vehicle, so as to be located to the rear of the steering shaft 28 with respect to the front-back direction of the vehicle. Furthermore, the intake port 9a opens to the left in the widthwise direction of the vehicle, more specifically, somewhat to the left and diagonally rearward.

The transmission case 21a has an air intake opening 21b which admits cooling air into the transmission case 21a and an exhaust opening 21c which exhausts the cooling air. The air intake opening 21b is formed so as to protrude toward the front of the vehicle from the front wall part of the transmission case 21a, and the exhaust opening 21c is formed so as to protrude toward the rear of the vehicle from the rear wall part of the transmission case 21a.

An air intake duct 34 is connected to the air intake opening 21b of the transmission case 21a, and an exhaust duct 35 is connected to the exhaust opening 21c.

The air intake duct 34 and exhaust duct 35 are arranged, in plan view, such that the front part thereof runs along the right outer side of the air cleaner 9 with respect to the widthwise direction of the vehicle, and more specifically, have the following structure.

The air intake duct 34 extends slightly toward the front of the vehicle from the air intake opening 21b, extends from there to the right in the widthwise direction of the vehicle, and then extends upward along the outside of the front suspension pipe 15f, and further extends upward along the inside of the upper frame 15a.

A connection port 34a formed on the downstream end of the air intake duct 34 is connected to the air intake opening 21b, and an intake port 34b formed on the upstream end is arranged above the air intake opening 21b, specifically, near the top end of the steering shaft 28. Furthermore, the air intake port 34b is arranged so as to be located between the left and right upper frames 15a and at the same position with respect to the front-back direction of the vehicle as the front end part 8' of the handlebar member 8 at the time of minimum turning. The air intake port 34b furthermore opens toward the front of the vehicle below the handlebar member 8.

The exhaust duct 35 curves upward from the exhaust opening 21c so as to go around the back of the transmission case 21a and extends between the left and right frame members 15 in the front-back direction of the vehicle, the part 35' between the frame members 15 extends substantially in a straight line along the inside, with respect to the widthwise direction of the vehicle, of part 32' of the exhaust pipe 32, rising toward the front of the vehicle, and further extends forward along the outside of the right upper frame 15a so as to move away from the air intake duct 34.

The connection port 35a formed on the upstream end of the exhaust duct 35 is connected to the exhaust opening 21c, and the exhaust port 35b formed on the downstream end of the exhaust duct 35 is located to the right (to one side) of the steering shaft 28 with respect to the widthwise direction of the vehicle and to the right and outside of the right upper frame 15a. Furthermore, the exhaust port 35b opens toward the bottom of the vehicle. Moreover, the exhaust port 35b is arranged so that at least a portion of it is located forward, with respect to the front-back direction of the vehicle, of the front end part 8' of the handlebar member 8 at the time of minimum turning.

In one embodiment, the exhaust port 35b of the exhaust duct 35 and the intake port 9a of the air cleaner 9 have the following relative arrangement relationship. The exhaust port 35b of the exhaust duct 35 is provided at a location further to the front, with respect to the front-back direction of the vehicle, and lower than, the intake port 9a of the air cleaner 9.

The exhaust port 35b is provided at a location lower than the air intake port 34b of the air intake duct 34.

Figure 1:
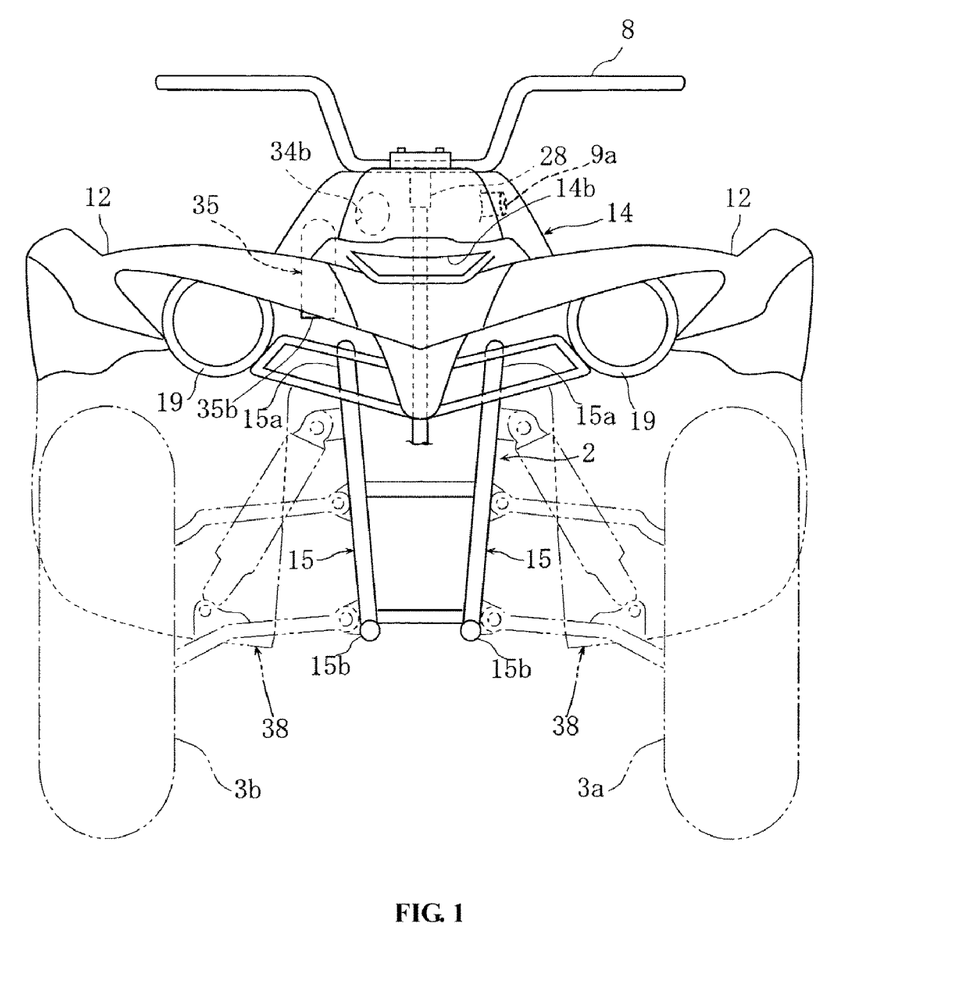
FIG. 1 is a front view of a vehicle according to an embodiment of the present invention.
Figure 2:
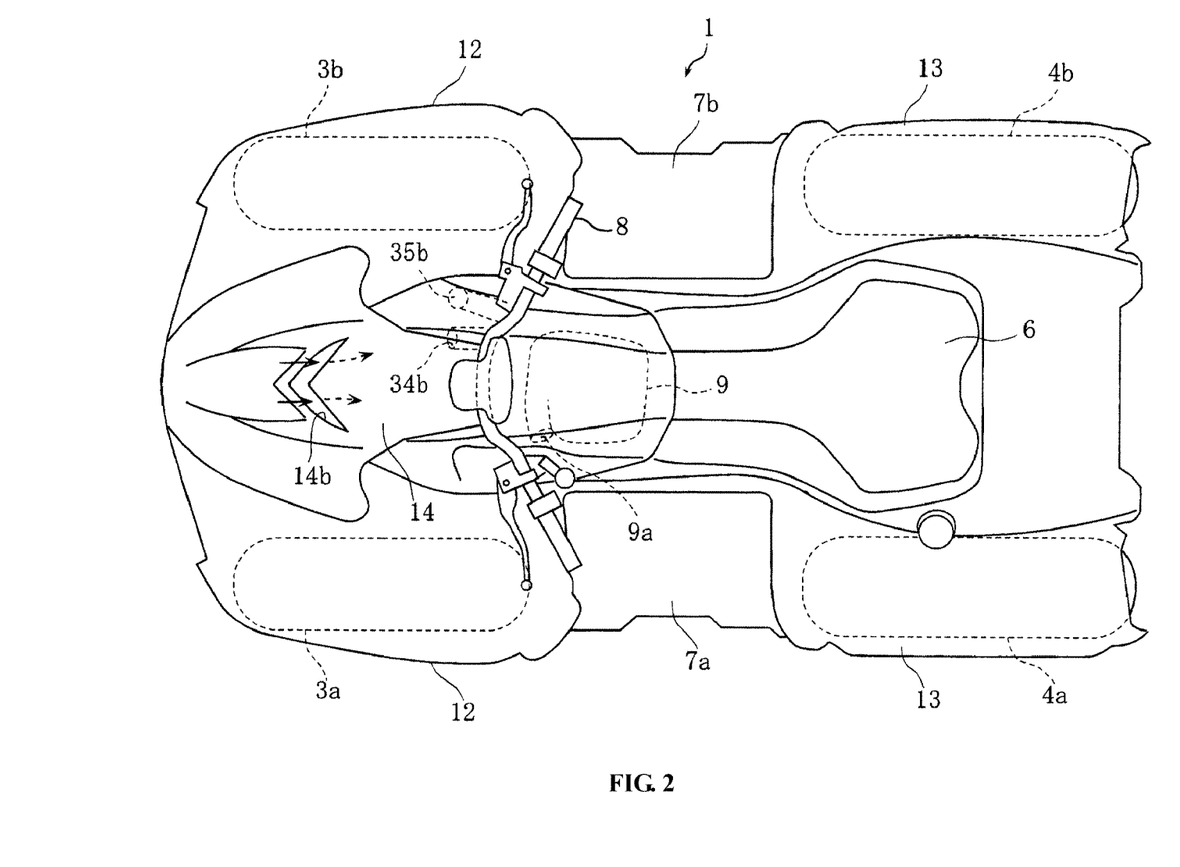
FIG. 2 is a plan view of said vehicle.
Figure 3:
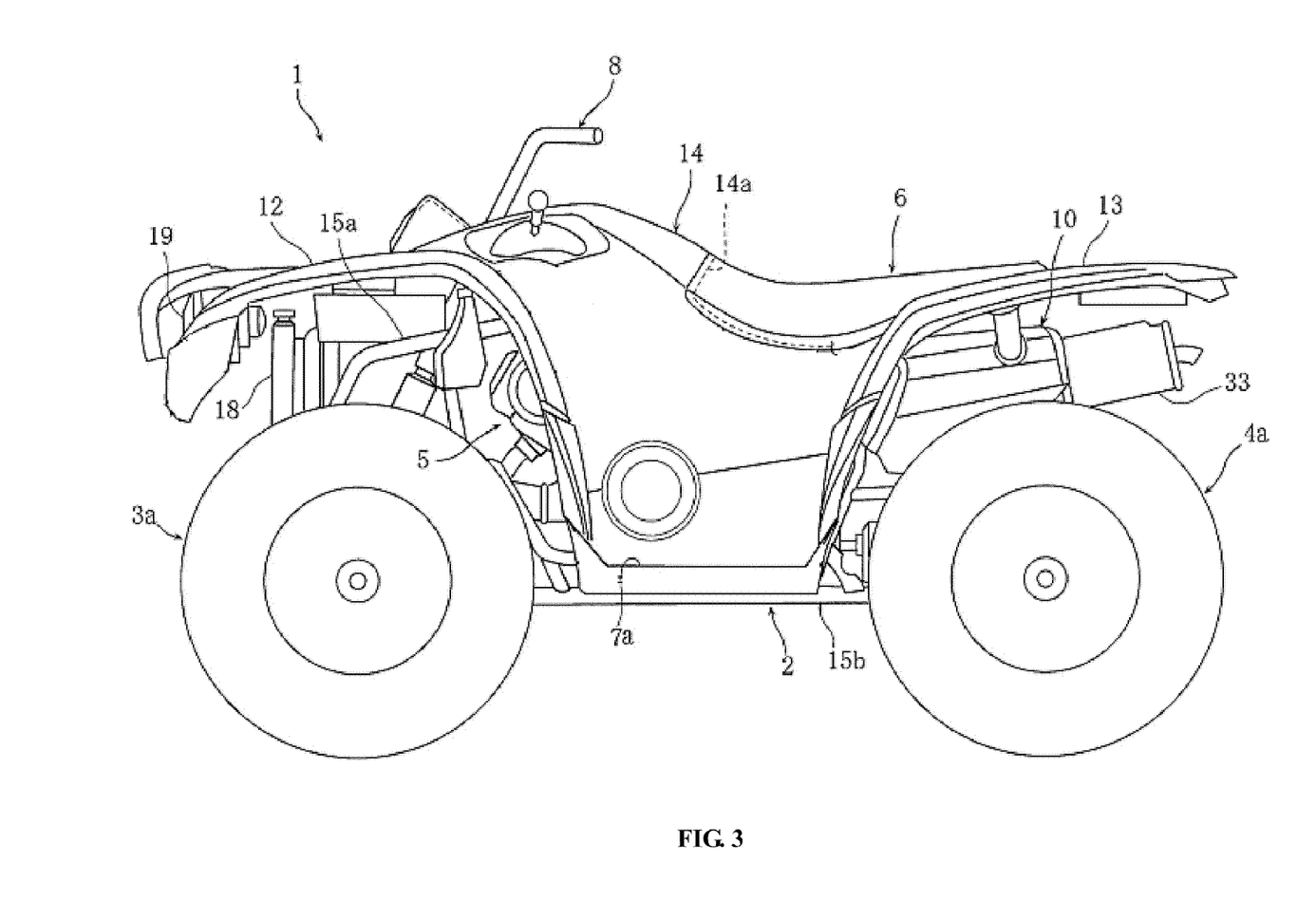
FIG. 3 is a left side view of said vehicle.
Figure 4:
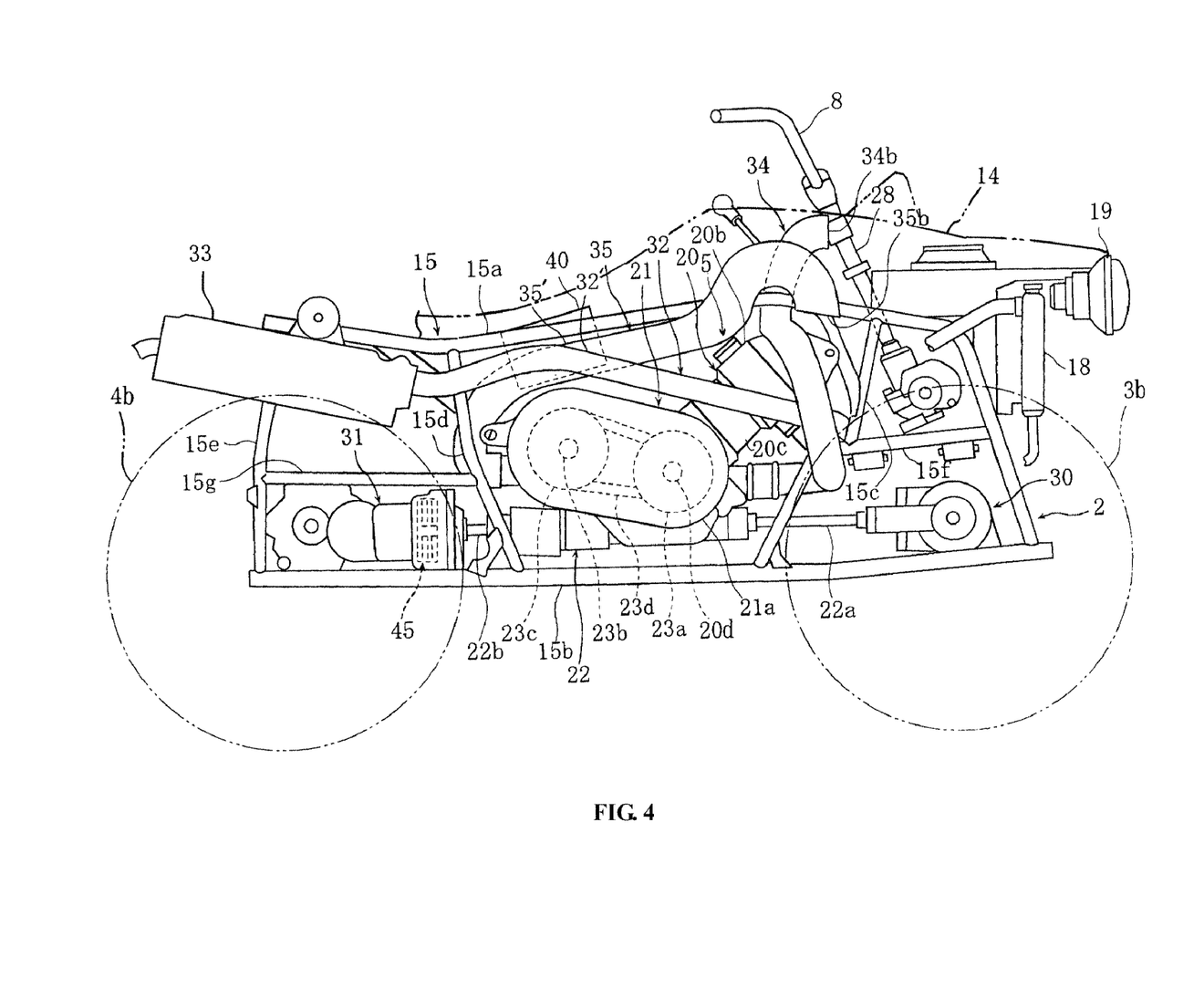
FIG. 4 is a right side view of said vehicle where the vehicle body cover, fender, seat, etc. of said vehicle have been removed.

The area around the steering shaft 28, the exhaust port 35b of the exhaust duct 35, and the air intake port 34b of the air intake duct 34, as well as the intake port 9a of the air cleaner 9, are covered by the cover member 14 (see FIG. 1 and FIG. 2).

Furthermore, in the cover member 14, the opening 14b is provided so as to be located to the front of the handlebar member 8, slightly lower than the air intake opening 34b of the air intake duct 34, and slightly higher than the exhaust opening 35b of the exhaust duct 35. The opening 14b opens toward the front of the vehicle, and the air stream generated by travel which flows into this opening 14b flows rearward through the inside of the cover member 14.

In one embodiment, the exhaust port 35b of the exhaust duct 35 is provided to the right side of the steering shaft 28 with respect to the widthwise direction of the vehicle, the intake port 9a of the air cleaner 9 is provided to the left side of the steering shaft 28 with respect to the widthwise direction of the vehicle, a cover member 14 covers the area around the steering shaft 28, the intake port 9a and the exhaust port 35b, and the opening 14b in the cover member 14 is formed so as to open toward the front of the vehicle.

Thus, in one embodiment, an air flow from the front to the rear is generated inside the cover member 14 when the vehicle 1 travels, and when that air flow passes along the right side of the steering shaft 28, the exhaust discharged from the exhaust port 35b is pushed toward the rear of the vehicle. The exhaust can thereby be kept from being sucked into the intake port 9a of the air cleaner 9 even if the exhaust port 35b and intake port 9a are arranged relatively close to each other. As a result, decline in engine performance can be avoided while making the body compact. Assuming the exhaust were to be sucked into the air cleaner, to the extent that the temperature of the air sucked into the engine rises, the charging efficiency will decline, becoming a hindrance to improving engine performance.

Furthermore, in one embodiment, the exhaust port 35b of the exhaust duct 35 is oriented downward and the intake port 9a of the air cleaner 9 is oriented diagonally to the left and rear, so the exhaust discharged from the exhaust port 35b is more reliably pushed to the rear by the air stream generated by travel, making it possible to more reliably prevent the exhaust from being sucked into the intake port 9a.

Moreover, in exemplary embodiments, the exhaust port 35b of the exhaust duct 35 and the intake port 9a of the air cleaner 9 are arranged apart with respect to the widthwise direction of the vehicle, and the exhaust port 35b is arranged further to the front of the vehicle than the intake port 9a, thus being arranged apart also with respect to the front-back direction of the vehicle, thereby making it possible to more reliably prevent the exhaust discharged from the exhaust port 35b from being sucked into the intake port 9a.

Furthermore, in one embodiment, at least a portion of the exhaust port 35b of the exhaust duct 35 is located further forward with respect to the front-back direction of the vehicle than the front end part 8' of the handlebar member 8 at the time of minimum turning, and the intake port 9a of the air cleaner 9 is located to the rear of the steering shaft 28 with respect to the front-back direction of the vehicle, thus making it possible to arrange the exhaust port 35b and the intake port 9a apart from each other with respect to the front-back direction of the vehicle.

Furthermore, the air intake port 34b of the air intake duct 34 is arranged away upward from the exhaust port 35b of the exhaust duct 35, thus making it possible to prevent exhaust from the exhaust port 35b from entering the air intake port 34b. Furthermore, the air intake port 34b is arranged at a location near the opening 14b, so that the air stream generated by travel can be reliably taken into the air intake port 34b, as a result making it possible to ensure cooling of the inside of the transmission case 21a.

The invention claimed is:

1. A vehicle comprising:
a vehicle body frame having a predetermined length and width and having a central axis defining a central plane;
a pair of left and right front wheels supported on a front part of said vehicle body frame and a pair of left and right rear wheels supported on a rear part of said vehicle body frame;
a seat supported on said vehicle body frame so as to be located between said pair of left and right front wheels and said pair of left and right rear wheels with respect to a front-back direction of the vehicle;
a steering shaft which steers said pair of left and right front wheels;
an engine unit supported on said vehicle body frame and arranged rearward of said steering shaft with respect to the front-back direction of the vehicle, said engine unit including a crankcase, a cylinder extending from said crankcase, and a transmission case which is provided to a side of said crankcase in a widthwise direction of the vehicle and houses a transmission;
an air intake duct communicating air to said cylinder, said air intake duct including an air intake port receiving air from the ambient environment;
said air intake duct positioned to one side of said steering shaft with respect to said central plane;
a transmission air intake for communicating air from the ambient environment to said transmission case; and
a transmission air exhaust duct which has an exhaust port exhausting air from inside said transmission case, said transmission air exhaust duct provided to one side of said steering shaft with respect to said central plane opposite said air intake duct.

2. The vehicle of claim 1, further including an air cleaner in communication with said air intake duct, the air cleaner being arranged above said cylinder.

3. The vehicle of claim 1, further including a cover member which covers an area around said steering shaft, said transmission air exhaust duct, and said air intake port, said cover member including an opening which opens to a front of the vehicle and fluidly directs air towards said transmission air exhaust duct.

4. The vehicle of claim 3, wherein said opening of said cover member is located at a height above said transmission air exhaust duct and below said air intake port.

5. The vehicle as described in claim 1 wherein said transmission air exhaust duct opens toward a bottom of the vehicle, and said air intake port opens toward an outside of the vehicle with respect to the widthwise direction of the vehicle.

6. The vehicle of claim 5, wherein said air intake port is oriented to open diagonally toward a left and a rear of said vehicle.

7. The vehicle as described in claim 1, wherein said transmission air exhaust duct is provided further forward than said air intake port with respect to the front-back direction of the vehicle.

8. The vehicle as described in claim 7, wherein said air intake port is provided rearward of said steering shaft.

9. The vehicle as described in claim 1, further including a handlebar communicating with said steering shaft and wherein said transmission air exhaust duct is provided further forward with respect to the front-back direction of the vehicle than a front end part of said handlebar at a time of minimum turning of the handlebar.

10. The vehicle as described in claim 1, wherein the transmission air exhaust duct is provided at a location lower than the air intake port of said air intake duct.

11. The vehicle of claim 1, wherein said air intake duct delivers air to an air intake tube connected to said cylinder, said air intake tube including a throttle body therein.

12. The vehicle of claim 1, wherein said transmission case houses a V-belt automatic transmission including a drive pulley and a follower pulley.

13. A vehicle comprising:
an engine unit including a crankcase, a cylinder extending from said crankcase, and a transmission case which is provided to a side of said crankcase in a widthwise direction of the vehicle and houses a transmission;
said transmission case including a transmission case air intake opening and a transmission case exhaust opening;
a transmission air intake port in communication with said transmission case air intake opening, said transmission air intake port being directed to a front of said vehicle receiving air from a frontal direction;
a transmission air exhaust port in communication with said transmission case exhaust opening discharging air from said transmission case;
said transmission air exhaust port directing discharged air in a downward direction;
said transmission air intake port being elevated above said transmission air exhaust port; and
an air intake duct communicating air to said cylinder, said air intake duct including an air intake port receiving air from the ambient environment;
said air intake duct positioned to one side of a steering shaft with respect to a central plane of the vehicle; and
said transmission air exhaust port provided to one side of said steering shaft with respect to said central plane opposite said air intake duct.

14. The vehicle of claim 13, further including an air cleaner in communication with said air intake duct, is the air cleaner being arranged above said cylinder.

15. The vehicle of claim 13, further including a cover member which covers an area around said transmission air exhaust port and said air intake port, said cover member including an opening which opens to a front of the vehicle and fluidly directs air towards said transmission air exhaust port.

16. The vehicle of claim 15, wherein said opening of said cover member is located at a height above said transmission air exhaust port and below said air intake port.

17. The vehicle as described in claim 13, wherein said transmission air exhaust port opens toward a bottom of the vehicle, and said air intake port opens toward an outside of the vehicle with respect to the widthwise direction of the vehicle.

18. The vehicle of claim 17, wherein said air intake port is oriented to open diagonally toward a left and a rear of said vehicle.

19. The vehicle as described in claim 13, wherein said transmission air exhaust port is provided further forward than said air intake port with respect to a front-back direction of the vehicle.

20. The vehicle as described in claim 13, wherein the transmission air exhaust port is provided at a location lower than the air intake port of said air intake duct.

21. The vehicle of claim 13, wherein said air intake duct delivers air to an air intake tube connected to said cylinder, said air intake tube including a throttle body therein.

22. The vehicle of claim 13, wherein said transmission case houses a V-belt automatic transmission including a drive pulley and a follower pulley.

* * * * *